(12) United States Patent
Shimizu

(10) Patent No.: US 6,496,650 B2
(45) Date of Patent: Dec. 17, 2002

(54) CAMERA WITH FLASH UNIT

(75) Inventor: Motokazu Shimizu, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/899,131

(22) Filed: Jul. 6, 2001

(65) Prior Publication Data

US 2002/0003954 A1 Jan. 10, 2002

(30) Foreign Application Priority Data

Jul. 6, 2000 (JP) ........................................ 2000-204551

(51) Int. Cl.$^7$ ............................................... G03B 15/05
(52) U.S. Cl. ........................................................ 396/62
(58) Field of Search ........................... 396/62, 61, 175, 396/176, 177

(56) References Cited

U.S. PATENT DOCUMENTS 4,944,030 A  7/1990 Haraguchi et al. ............. 396/62
5,083,146 A  1/1992 Ueda ............................. 396/62

Primary Examiner—W. B. Perkey
(74) Attorney, Agent, or Firm—Young & Thompson

(57) ABSTRACT

A zoom flash unit is disposed above a film containing chamber. Driving force of a magnification varying motor is transmitted to the zoom flash unit via a gear train, a rack plate, and a lever. By transmitting the driving force to the zoom flash unit, a flash angle is changed in accordance with a focal length of a taking lens. The gear train is disposed at the front of the film containing chamber, and the rack plate and the lever are disposed at the right thereof. The end of the rack plate bent at an angle of 90° is formed with rack teeth meshing with an output gear of the gear train. Owing to this structure, the mechanism for transmitting the driving force is easily disposed in a small space formed between the film containing chamber and an outer cover of a camera.

13 Claims, 4 Drawing Sheets

CAMERA WITH FLASH UNIT

BACKGROUND OF THE INVENTION

1. Field of the Invention

The present invention relates to a camera with a flash unit in which the flash unit is moved by utilizing a lens-barrel driving motor which is for moving a taking lens.

2. Description of the Related Art

Conventionally, it is known that some compact zoom cameras have a flash-angle changing mechanism by which a flash angle of a flash unit is changed. As to the flash-angle changing mechanism, there are some types. In one of the types, an angle of a reflection member is changed. In another type, distances from an optical panel to a discharge tube and a reflector are changed. The optical panel is a diffusion plate or a condenser plate, for example.

It is necessary to adjust the flash angle to a photographic angle of view. In the case of the zoom camera, the flash angle is consecutively changed in association with a change of the photographic angle of view. Changing the flash angle is performed by utilizing a magnification varying motor which moves a taking lens in an optical axis direction at the time of varying the magnification. A rotation of the magnification varying motor is transmitted to a viewfinder as well to be used as a driving force for shifting a visual field of the viewfinder.

There are some ways for transmitting the driving force of the magnification varying motor to the flash-angle changing mechanism. In one of the ways, the driving force is directly transmitted from the magnification varying motor. In another way, the driving force is transmitted via a lens guiding mechanism which moves the taking lens in the optical axis direction. In the other way, the driving force is transmitted via the viewfinder. Meanwhile, the general camera includes a film containing chamber and a cartridge containing chamber respectively arranged at both sides of an exposure aperture. The viewfinder is disposed above a lens barrel. A zoom flash unit is separated from the taking lens as far as possible and is disposed above the film containing chamber or the cartridge containing chamber, in order to reduce red-eye effect.

In consideration of the above background, a mechanism for transmitting the driving force to the zoom flash unit must be constructed in any event such that the driving force is led from a front side of the camera to an above portion of either of the film containing chamber and the cartridge containing chamber via a periphery thereof. However, as the zoom camera becomes compact, its inside space is also downsized. When the mechanism for transmitting the driving force to the zoom flash unit is constructed only by gear trains, transmitting the driving force is efficiently performed, whereas this mechanism is difficult to be adopted because of a space for arranging plenty of gears. Meanwhile, when the transmitting mechanism employs an endless belt or an endless rubber band, a space and a number of parts may be reduced. In this case, however, the flash angle is likely to be shifted relative to a magnification position of the taking lens due to a slip. Thus, such a mechanism is also difficult to be adopted.

Moreover, regarding the route from the front side of the camera to the above portion of either of the film containing chamber and the cartridge containing chamber, it is necessary to provide a mechanism for changing a transmission direction crosswise by at least one time. As to such a mechanism, it is well known to use gears of an intersecting axis and a hyperboloidal axis, for example, a worm gear and a bevel gear. However, in case these gears are employed, assembly thereof is difficult. At the same time, a contact load of the gears is great so that it is necessary to use the magnification varying motor having large torque. Thus, there arises a problem in that the cost increases.

By the way, there is a type in which a flash unit is popped up from a retracted position to a flash-photographing position in association with the lens barrel moving from a collapsible-mount position to a photographing position. The flash unit is contained in the camera when kept in the retracted position, and emerges to the outside when kept in the flash-photographing position. This type has a problem similar to the above with respect to a mechanism for transmitting a driving force of a lens-barrel moving motor to the flash unit.

SUMMARY OF THE INVENTION

In view of the foregoing, it is a primary object of the present invention to provide a camera with a built-in flash unit in which a mechanism for transmitting a driving force of a motor to the flash unit is efficiently arranged in a small space.

It is a second object of the present invention to provide a camera with a built-in flash unit in which a mechanism for transmitting a driving force of a motor to the flash unit is easily assembled.

It is a third object of the present invention to provide a camera with a built-in flash unit in which a mechanism for transmitting a driving force of a motor to the flash unit has an advantage regarding its cost.

In order to achieve the above and other objects, the camera with the built-in flash unit according to the present invention comprises a driving-force transmission mechanism including a gear train and a rack plate.

The gear train is disposed in front of a camera main body and is rotated by a driving force of a motor which is used for moving a lens barrel to vary a magnification. The rack plate is disposed at a side of the camera main body so as to be movable in a vertical direction. The driving force of the motor is transmitted to the flash unit via the gear train and the rack plate to change a flash angle of the flash unit in accordance with a focal length of a taking lens.

In a preferred embodiment, the gear train is disposed in front of a film containing chamber of the camera main body, and the rack plate is disposed at a right side of the film containing chamber. The rack plate is provided with rack teeth meshing with an output gear of the gear train. A portion of the rack teeth is bent so as to be located in front of the film containing chamber.

According to the present invention, the driving force of the motor is easily and efficiently transmitted crosswise from the front of the film containing chamber to the right side thereof. Moreover, assembly of the driving-force transmission mechanism is easy. Further, rotating the gear train and moving the rack plate are respectively performed in a plane parallel with an outer wall of the film containing camber. Thus, the driving-force transmission mechanism is easily disposed in a small space formed between the film containing chamber and a cover of the camera. Hence, the camera may be downsized.

Incidentally, the gear train and the rack plate may be respectively disposed at the front and the right of a cartridge containing chamber instead of the film containing chamber.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
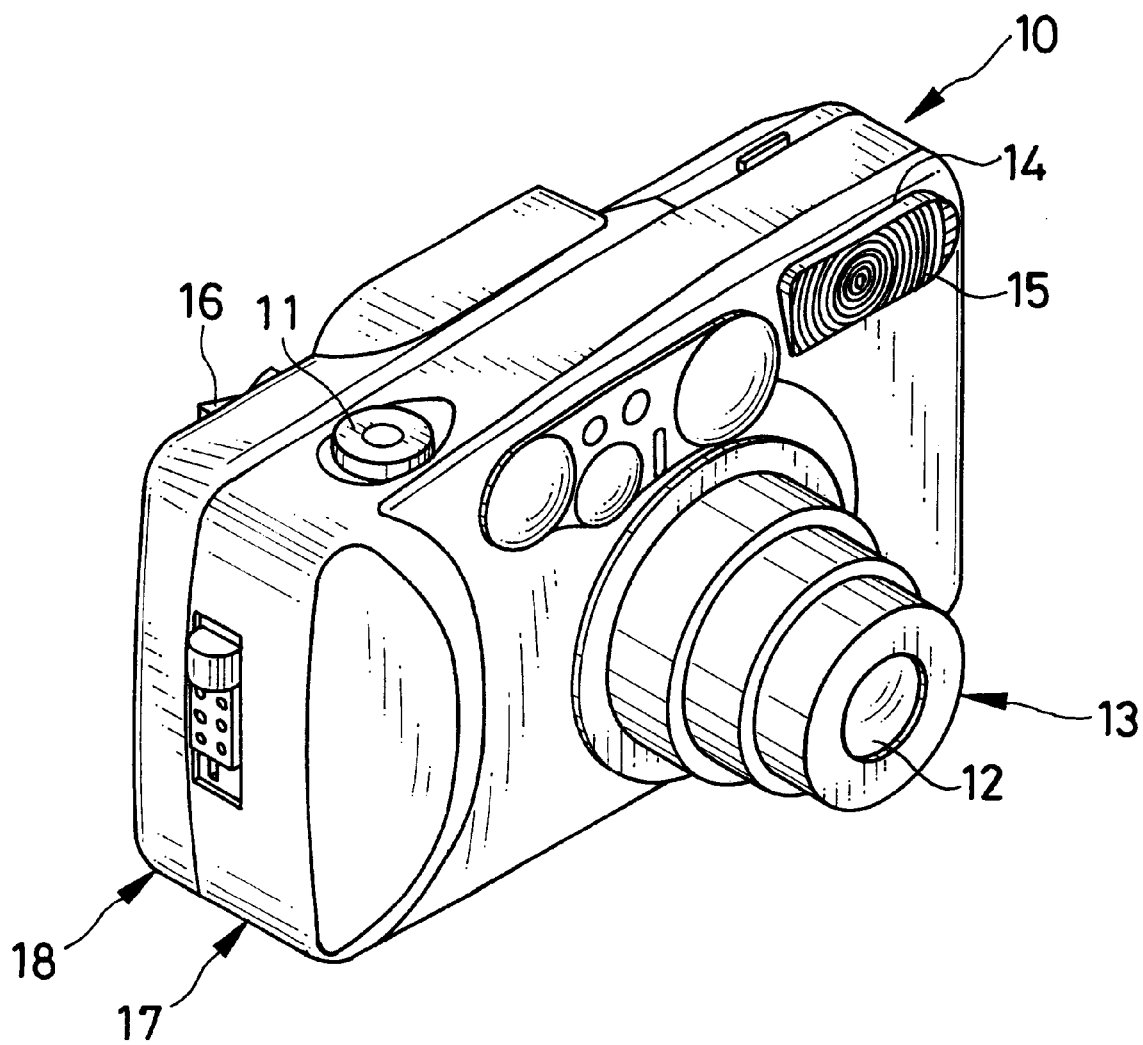
FIG. 1 is a perspective view showing a zoom camera according to the present invention.

As shown in FIG. 1, an upper face of a zoom camera 10 is provided with a shutter button 11, and a central portion of a front face thereof is provided with a lens barrel 13 containing a taking lens 12. Moreover, a flash window 14 is provided at a right-upper portion of the lens barrel 13. To the flash window 14, is attached an optical panel 15 also used as a protector. The optical panel 15 is a diffusion plate or a condenser plate. An outer cover of the zoom camera 10 is constituted of a front cover 17 and a rear cover 18.

A rear portion of the camera 10 is provided with a magnification operating member 16. This member 16 includes two operating sections, one of which is for varying a magnification toward a telephoto side, and the other of which is for varying the magnification toward a wide-angle side. When the magnification operating member 16 is manipulated, the lens barrel 13 is moved in an optical-axis direction to change a focal length of the taking lens 12. In association with the change of the focal length, a flash angle is changed. Owing to this, the flash light emitted at the time of flash photographing irradiates an area of the photographic angle of view corresponding to the present focal length.

Figure 2:
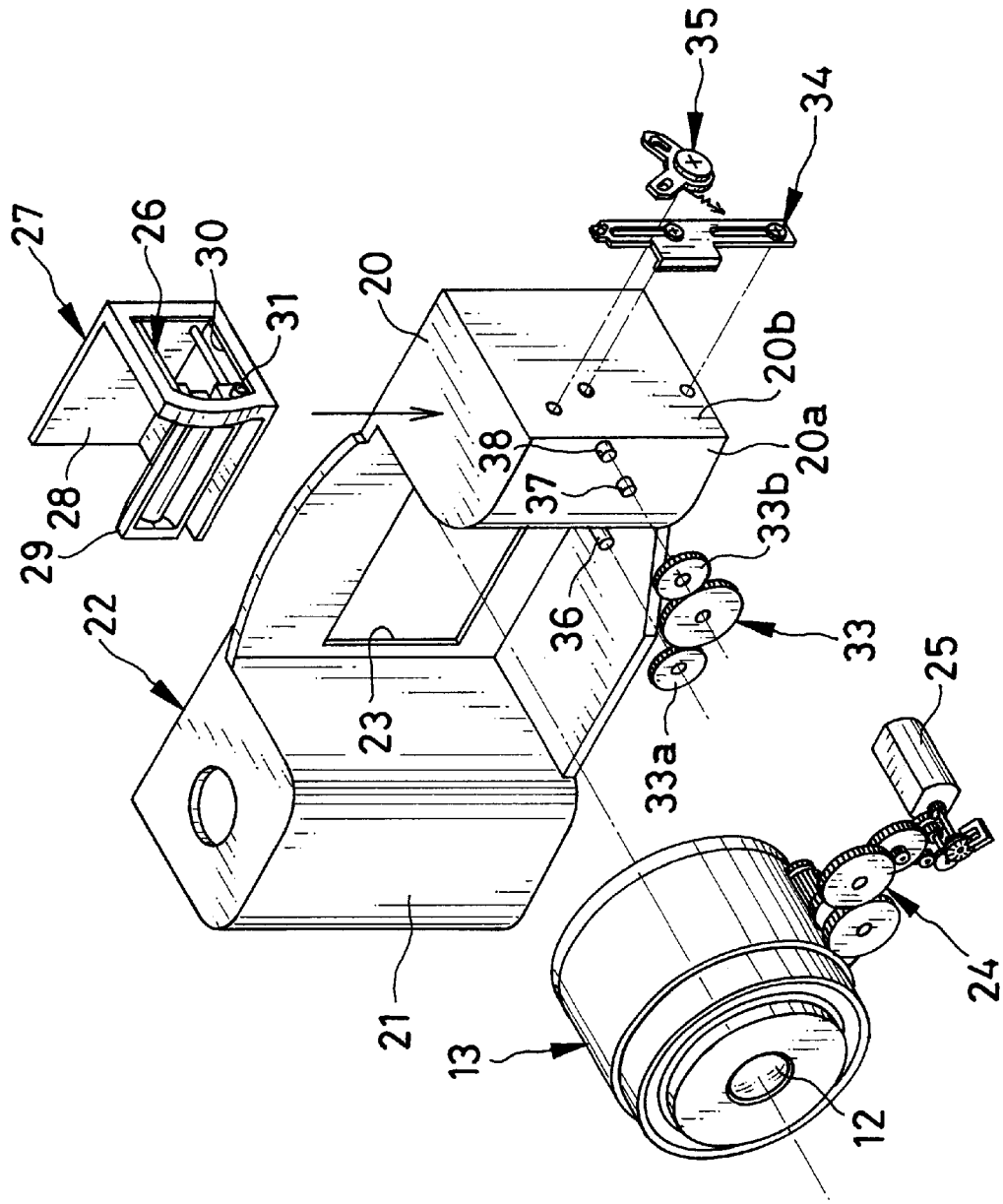
FIG. 2 is an exploded perspective view partially showing a structure of the camera.

As shown in FIG. 2, the camera has a built-in camera main body 22 including a film containing chamber 20 and a cartridge containing chamber 21. The film containing chamber 20 and the cartridge containing chamber 21 are respectively disposed at both sides of an exposure aperture 23. The cartridge containing chamber 21 is loaded with a photo film cartridge along a spool direction. A photo film advanced from the photo film cartridge is forwarded to the film containing chamber 20 via the exposure aperture 23. The film containing chamber 20 contains the forwarded photo film in a roll form. A vertical length of the film containing chamber 20 is shorter than that of the cartridge containing chamber 21. Thus, there are gaps between upper and lower portions of the film containing chamber 20 and the cases 17 and 18.

The lens barrel 13 is disposed in front of the exposure aperture 23. The lens barrel 13 is constituted of the taking lens 12, a lens moving mechanism, a first gear train 24, and a magnification varying motor 25 which are integrated as a unit. The first gear train 24 transmits a driving force of the motor 25 to vary the magnification. In other words the first gear train 24 transmits a rotation of the motor 25 to the lens moving mechanism in a reduced state. The lens moving mechanism is constituted of a helicoid and a cam, for example, to rotate a movable barrel constituting the lens barrel 13. The movable barrel is moved relative to a fixed barrel in the optical-axis direction.

Respective gears of the first gear train 24 are rotatably attached to shafts being parallel with the optical axis. Each of the shafts is formed on a plate (not shown) attached to the. fixed barrel. The first gear train 24 is disposed at a front side of the lens barrel 13. Further, the first gear train 24 is arranged in a film advancing direction from a right-lower portion of the lens barrel 13 in FIG. 2. The motor 25 is disposed such that a rotary shaft thereof is perpendicular to the arrangement direction of the first gear train 24. The motor 25 enters the gap formed under the film containing chamber 20.

A zoom flash unit 27 is disposed above the film containing chamber 20 and is constituted of a flash-angle changing mechanism 26, a base member 28, and a flash emitting portion 29 and so forth. The flash emitting portion 29 is supported by the base member 28 so as to be movable in the optical-axis direction. The base member 28 has a bottom wall, a rear wall, and a right-side wall formed with an opening 30. A connection pin 31 protrudes through the opening 30. To the connection pin 31, is transmitted a driving forth for moving the flash emitting portion 29 in the optical-axis direction.

A driving-force transmission mechanism for the zoom flash unit is disposed between the film containing chamber 20 and the first gear train 24. The driving-force transmission mechanism transmits the driving force of the motor 25 from a front face 20a of the film containing chamber 20 toward the above portion of the film containing chamber 20 via a right-side face 20b thereof. This mechanism is constituted of a second gear train 33, a rack plate 34, and a lever 35. The second gear train 33 transmits the driving force to the rack plate 34 and comprises a plurality of gears arranged in the film advancing direction. Respective gears of the second gear train 33 are rotatably attached to shafts 36 to 38 which are parallel with the optical axis. Each of the shafts 36 to 38 is formed on the front face 20a of the film containing chamber 20. An input gear 33a of the second gear train 33 meshes with a part of the first gear train 24.

Figure 3:
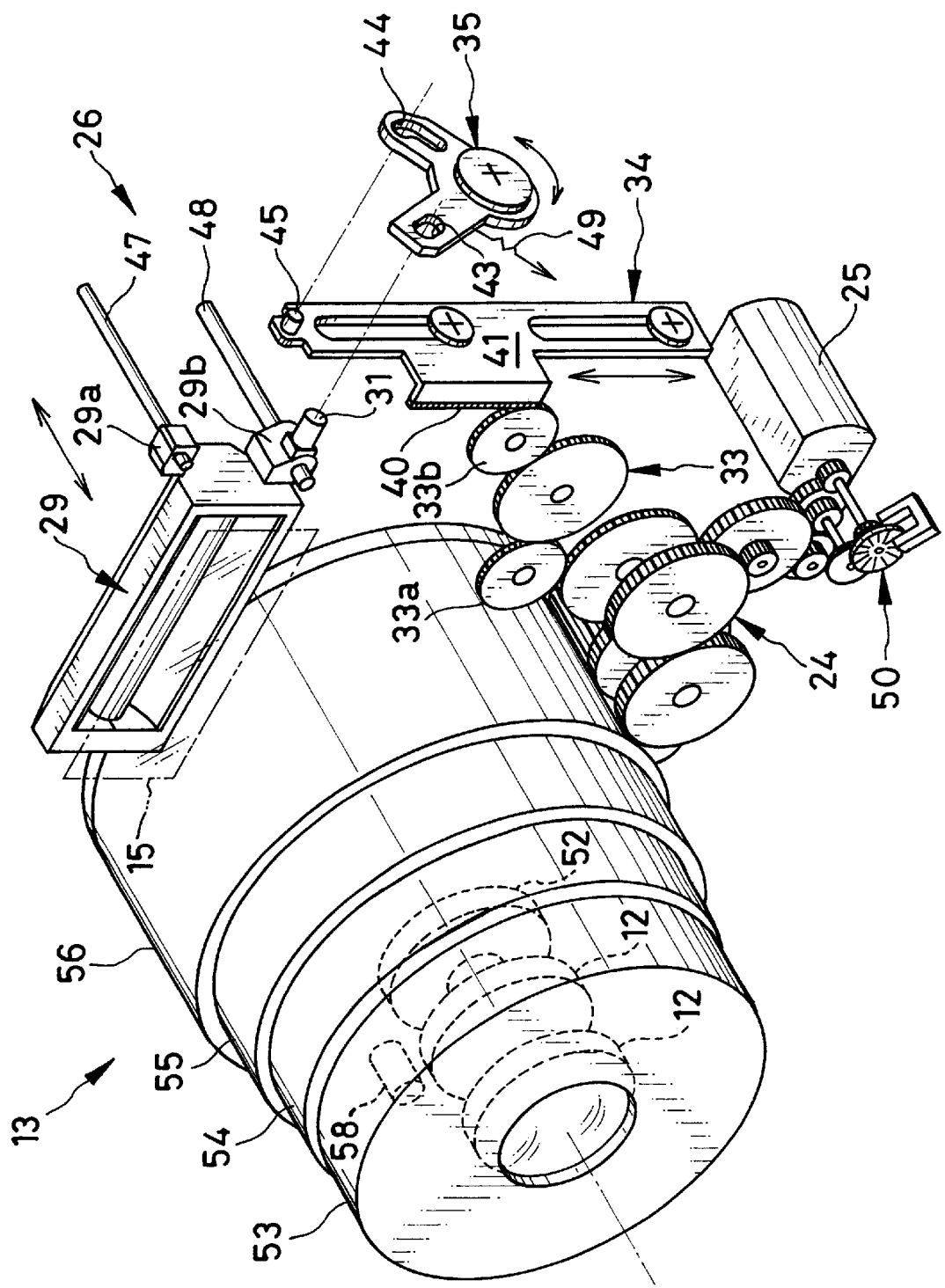
FIG. 3 is a perspective view showing a mechanism for changing a flash angle, a gear train for transmitting a driving force to a flash unit, a gear train for transmitting the driving force to vary a magnification, and a motor used for varying the magnification.

FIG. 3 shows the rack plate 34 in detail. The rack plate 34 transmits the driving force, which is received from the second gear train 33 disposed at the front face 20a of the film containing chamber 20, toward the right-side face 20b of the film containing chamber 20. In other words, the rack plate 34 transmits the driving force crosswise. For this purpose, the rack plate 34 is formed such that a rack (row of teeth) 40 and a slider 41 are bent at an angle of 90° so as to have an L-like shape on its section. The slider 41 is attached to the right-side face 20b of the film containing chamber 20 so as to be movable in a vertical direction. The rack 40 meshes with an output gear 33b of the second gear train 33. Hence, the rack plate 34 converts a rotation of the output gear 33b into the vertical movement.

The lever 35 has a V-like shape and is rotatably attached to the right-side face 20b of the film containing chamber 20. One end of the lever 35 is formed with a connection hole 43, and the other end thereof is formed with an engagement hole 44. The connection hole 43 engages with the connection pin 31 of the flash emitting portion 29. The engagement hole 44 engages with an engagement pin 45 formed at an upper portion of the slider 41. The lever 35 converts the vertical movement of the rack plate 34 into seesaw movement in the optical-axis direction to transmit the driving force to the flash emitting portion 29.

The flash emitting portion 29 is constituted of a flash discharge tube, a reflector, and so forth. The flash-angle changing mechanism 26 is constituted of two bearings 29a and 29b, two guide rods 47 and 48, and so forth. The guide rods 47 and 48 are disposed so as to be parallel with the optical axis. The bearings 29a and 29b, into which the guide rods 47 and 48 are respectively fitted, are provided on the flash emitting portion 29.

The rack plate 34 is adapted to rotate the lever 35 in a counterclockwise direction when moving upward. Moreover, the rack plate 34 is adapted to rotate the lever 35 in a clockwise direction when moving downward. Upon rotating the lever 35 in the counterclockwise direction, the flash emitting portion 29 is moved toward a wide-angle flash position located near the back of the optical panel 15. Meanwhile, upon rotating the lever 35 in the clockwise direction, the flash emitting portion 29 is moved toward a narrow-angle flash position separating from the optical panel 15. Moving the rack plate 34 and rotating the lever 35 are carried out within a range corresponding to a total height of the film containing chamber 20 and the zoom flash unit 27. Incidentally, in the present embodiment, the flash emitting portion 29 is moved. However, the flash unit itself may be moved.

The flash emitting portion 29 is urged toward the wide-angle flash position by means of a spring 49 put on the lever 35. The spring 49 functions so as to absorb a backlash, looseness, etc. occurring in the mechanism transmitting the driving force to the zoom flash unit.

Incidentally, the first gear train 24 is provided with a sensor 50 for detecting a rotational angle of the motor. The sensor 50 includes a disk formed with a plurality of slits, and a transmission-type photo sensor detecting a passage of the slit. It is possible to know a position of the taking lens 12 by counting a number of the slits with the photo sensor.

Next, an operation of the zoom camera is described below. In an initial state of the camera 10, the focal length of the taking lens 12 is set to the wide-angle side. At this time, the rack plate 34 is kept in the uppermost position. Moreover, the flash emitting portion 29 is set to the wide-angle flash position being nearest to the back of the optical panel 15.

In response to the operation for varying the magnification toward the telephoto side, the motor 25 is rotated in one direction. The driving force is transmitted to the lens moving mechanism via the first gear train 24. Such as shown in FIG. 3, the lens moving mechanism according to the present embodiment is of a type in that the taking lens 12 is moved by protruding three lens barrels containing the taking lens 12 and a shutter mechanism 52. These lens barrels are first, second and third movable barrels 53, 54 and 55 which are movable relative to a fixed barrel 56 toward a subject.

The driving force of the motor 25 is also transmitted from the first gear train 24 to the second gear train 33. When the driving force is transmitted to the second gear train 33, the rack plate 34 is moved from the uppermost position toward the lowermost position. In association with the movement of the rack plate 34, the lever 35 is rotated in the clockwise direction to move the flash emitting portion 29 toward the narrow-angle flash position. When the operation of the magnification operating member 16 is over, the rotation of the motor 25 is stopped. At the same time, the lens barrel 13 and the flash emitting portion 29 are stopped to be moved. Owing to this, the flash emitting portion 29 is moved to a position where the flash angle corresponds to the present angle of view of the taking lens 12.

The film containing chamber 20 has a smaller contour in comparison with the cartridge containing chamber 21. Thus, spaces are obtained between the outer cover of the camera 10 and the film containing chamber 20. It is possible to dispose the second gear train 33 in this space.

Figure 4:
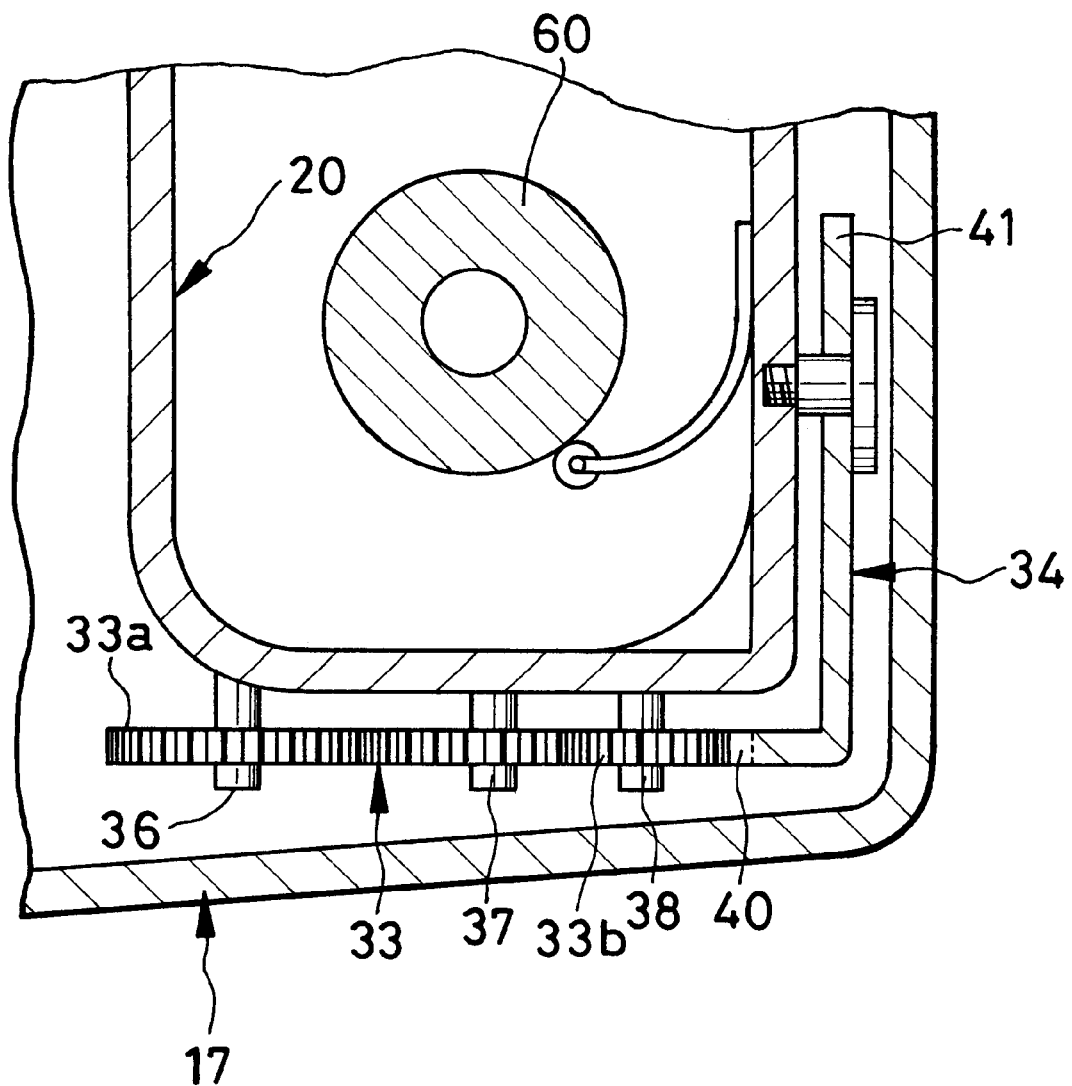
FIG. 4 is a sectional view partially showing a film containing chamber of the camera.

The front cover 17 of the camera generally has a curved surface slanting from the center thereof toward a flash-unit side. In this case, a space between the front cover 17 and the film containing chamber 20 is small. According to the present invention, however, the second gear train 33 may be easily disposed in the small space because the second gear train 33 is aligned in the film advancing direction such as shown in FIG. 4. Incidentally, reference numeral 60 shown in FIG. 4 denotes a film take-up spool.

The rack plate 34 is formed in the L-like shape on its section to transmit the driving force crosswise from the front face 20a of the film containing chamber 20 to the right-side face 20b thereof. Thus, it is not required to widen a corner space between the front cover 17 and the film containing chamber 20. Hence, the camera may be downsized. Further, the rack plate 34 and the lever 35 are moved in the range corresponding to the total height of the film containing chamber 20 and the zoom flash unit 27 so that the camera may be also downsized in its height direction.

When the shutter button 11 is depressed, first of all, a photometry mechanism and a distance measuring mechanism, which are not shown, are actuated in response to half depression thereof. Then, upon full depression of the shutter button 11, the taking lens 12 is moved for focusing in accordance with a subject-distance signal obtained from the distance measuring mechanism. In the present embodiment, a motor 58 for focusing is built in the first movable barrel 53. When the motor 58 is rotated, the taking lens 12 is moved in the optical-axis direction relative to the first movable barrel 53 to adjust the focus to a subject.

After focusing, the shutter mechanism 52 is actuated in accordance. with subject brightness obtained from the photometry mechanism to perform exposure. During this operation, the flash emitting portion 29 radiates the flash light toward the subject in response to a synchro signal obtained from the shutter mechanism 52. At this time, a radiation range is adapted to correspond to the current angle of view.

When the operation for varying the magnification is performed toward the wide-angle side, the motor 25 is rotated in reverse. Owing to the reverse rotation of the motor 25, the lens barrel 13 is moved backward, and the flash-emitting portion 29 is moved toward the wide-angle flash position.

In the above embodiment, the film containing chamber 20 and the cartridge containing chamber 21 are respectively disposed at the right side and the left side, viewing the camera from the front thereof. However, the film containing chamber 20 may be disposed at the left side and the cartridge containing chamber 21 may be disposed at the right side. In this case, the zoom flash unit 27 is disposed above the cartridge containing chamber. Accordingly, the gear train 33 is disposed in front of the cartridge containing chamber, and the rack plate 34 and the lever 35 are disposed at the right side thereof.

In the above embodiment, the flash-angle changing mechanism changes the flash angle such that the flash discharge tube is moved in the optical-axis direction behind the optical panel 15. The present invention is not exclusive to this. An angle of the reflector may be changed. In another way, the optical panel 15 may be moved in a state that the discharge tube and the reflector are fixed.

In the above embodiment, the driving force of the magnification varying motor is utilized for changing the flash angle of the flash unit. This driving force may be utilized for popping the flash unit up. In this case, the driving force is utilized, for example, while the lens barrel is moved from a collapsible-mount position toward the photographing position, for example toward the wide-angle side.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a flash unit in which an irradiation angle of flash light emitted in a forward direction of a camera body is changed in accordance with a focal length of a taking lens, said camera including a motor for varying said focal length of said taking lens and a driving-force transmission mechanism for transmitting a driving force of said motor to said flash unit, said taking lens and said flash unit being disposed so as to be separated in a vertical direction at a front side of a camera main body, said camera main body comprising a cartridge containing chamber loaded with a photo film cartridge and a film containing chamber for taking up a photo film advanced from said cartridge containing chamber, said driving-force transmission mechanism comprising:

a gear train rotated by said driving force of said motor, said gear train being attached to said front side of said camera main body;

a rack plate attached to a lateral side of said camera main body so as to be movable in an up-and-down direction, said rack plate moving said flash unit in a backward-and-forward direction in order to change said irradiation angle; and rack teeth provided on said rack plate, said rack teeth being bent in an L-shaped form so that a first portion of the rack plate comprising the rack teeth is arranged along a front side of a film containing chamber, and a second portion of the rack plate is arranged along a lateral side of the film containing chamber, and said rack teeth meshing with one gear of said gear train.

2. A camera according to claim 1, further comprising:

an optical panel disposed in front of a flash emitting portion of said flash unit.

3. A camera according to claim 2, wherein said rack plate moves said flash emitting portion and changes said irradiation angle of said flash light by altering a distance between said flash emitting portion and said optical panel.

4. A camera according to claim 3, further comprising:

a lever for moving said flash emitting portion in accordance with vertical movement of said rack plate.

5. A camera according to claim 4, wherein said lever has a V-configuration shape, one end of which engages with a pin formed on an upper portion of said rack plate, and the other end of which engages with a pin formed on said flash emitting portion, said lever being rotated to move said flash emitting portion when said rack plate is vertically moved.

6. A camera according to claim 5, further comprising:

a plurality of bearings provided on said flash emitting portion; and guide rods disposed in said backward-and-forward direction and fitted into said bearings, said flash emitting portion moving along said guide rods.

7. A camera according to claim 6, further comprising:

a spring put on said lever, said spring urging said flash emitting portion toward said optical panel.

8. A camera according to claim 1, wherein said flash unit is disposed above said film containing chamber, and said gear train and said rack plate are respectively attached to a front side and a lateral side of said film containing chamber.

9. A camera according to claim 8, wherein each gear of said gear train is rotatably attached to a pin formed on said front side of said film containing chamber.

10. A camera according to claim 1, further comprising:

a lever for moving said flash emitting portion in accordance with vertical movement of said rack plate.

11. A camera according to claim 10, wherein said lever has a V-configuration shape, one end of which engages with a pin formed on an upper portion of said rack plate, and the other end of which engages with a pin formed on said flash emitting portion, said lever being rotated to move said flash emitting portion when said rack plate is vertically moved.

12. A camera according to claim 2, further comprising:

a plurality of bearings provided on said flash emitting portion; and guide rods disposed in said backward-and-forward direction and fitted into said bearings, said flash emitting portion moving along said guide rods.

13. A camera according to claim 1, wherein each gear of said gear train is rotatably attached to a pin formed on said front side of said film containing chamber.

* * * * *